July 14, 1942. J. E. BUXTON 2,289,340
ENGINE STARTER DRIVE
Filed Sept. 26, 1940

Witness:
Burr W. Jones

INVENTOR.
James E. Buxton
BY Clinton S. Janes
ATTORNEY.

Patented July 14, 1942

2,289,340

UNITED STATES PATENT OFFICE 2,289,340

ENGINE STARTER DRIVE

James E. Buxton, Elmira Heights, N. Y., assignor to Bendix Aviation Corporation, South Bend, Ind., a corporation of Delaware Application September 26, 1940, Serial No. 358,496

5 Claims. (Cl. 74—7)

The present invention relates to an engine starter drive and more particularly to gearing for automatically connecting and disconnecting a starting motor to a member such as a flywheel gear of an engine to be started.

It is an object of the present invention to provide a novel starter drive which is efficient in operation, economical to construct and which is of small overall dimensions as compared to standard drives of like torque capacity.

It is another object to provide such a device in which separate yielding elements are provided for cushioning the drive, for enforcing mesh, for insuring traversal and for preventing pinion drift, so that each such element may be adapted to best accomplish its own function without regard to any ancillary function.

It is a further object to provide such a device in which the drive is cushioned by means of a split ring of elastically deformable material placed under circumferential compression by the torque transmitted.

Further objects and advantages will be apparent from the following description taken in connection with the accompanying drawing in which:

Fig. 5 is a perspective view of the thimble 22a.

Figure 1:
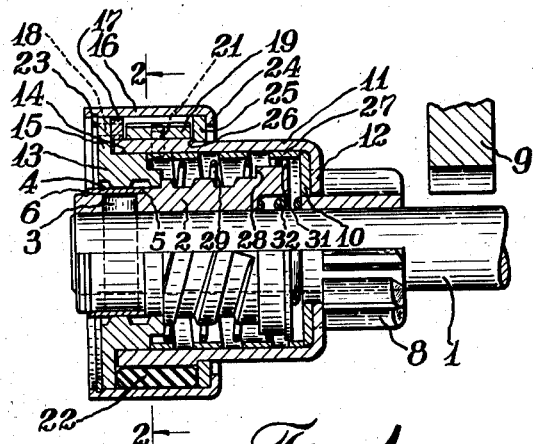
Fig. 1 is a side elevation partly in section of a preferred embodiment of the invention showing the parts in idle position.

In Fig. 1 of the drawing there is illustrated a power shaft 1 which may be the extended armature shaft of a starting motor, not illustrated, on the outer end of which a screw shaft 2 is fixedly mounted by any suitable means such as a cross pin 3. The pin 3 is retained in position by means of a thimble 4 surrounding a reduced terminal portion of the screw shaft through which the pin 3 extends, and held from longitudinal movement by a shoulder 5 on the screw shaft and a split lock ring 6. The outer surface of the thimble 4 is flush with or below the bottoms of the threads of the screw shaft in order to provide clearance for sliding movement of the nut 13.

A pinion 8 is slidably journalled on the power shaft 1 for longitudinal movement into and out of engagement with a member such as a flywheel gear 9 of an engine to be started. Pinion 8 is provided with a radial flange 10 fixedly secured thereto in any suitable manner. A barrel member 11 having an internal diameter such as to loosely surround the flange 10 is splined on the pinion 8 by means of inwardly extending lugs 12 engaging between the teeth of the pinion. A nut 13 is mounted on the screw shaft 2 and is provided with a bearing 14 for the open end of the barrel 11. Nut 13 also has a radial flange 15 forming an abutment for the end of the barrel 11 and also forming a support for a sleeve member 16.

Figure 2:
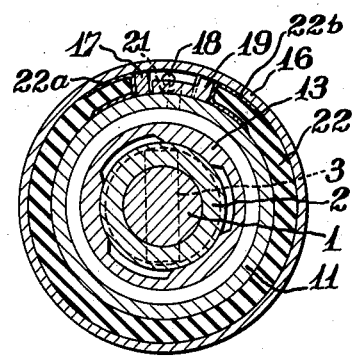
Fig. 2 is a section taken substantially on the line 2—2 of Fig. 1.
Figure 3:
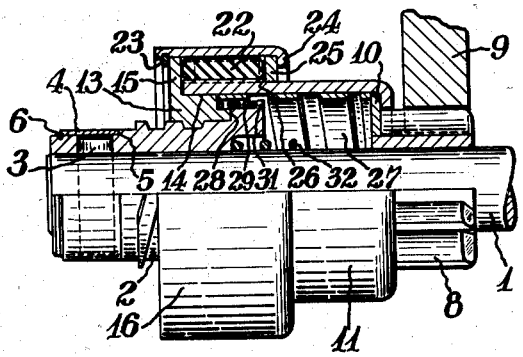
Fig. 3 is a side elevation partly in section showing the parts in driving position.
Figure 4:
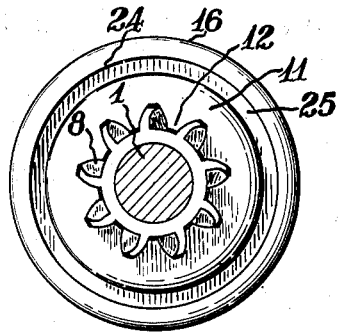
Fig. 4 is an end view of the drive from the right in Fig. 1.
Figure 5:

A driving block 17 is fixed to the flange 15 of the nut as by means of a rivet 18 (Fig. 2) or any other suitable means; a driven block 19 is fixed to the barrel 11 as by means of a rivet 21, and a split ring 22 of elastically deformable material such as rubber is located within the sleeve member 16 with its ends in abutting relation with the driving and driven blocks so as to form a yielding coupling between the nut and barrel. These parts are held in assembled relation by means of a split lock ring 23 in the sleeve member 16 bearing against the flange 15 of the nut, and by means of an inwardly extending flange 24 on the sleeve member which bears against a ring 25 seated on the barrel 11 against a shoulder 26 thereon. Thimbles or shields 22a and 22b may be mounted on the ends of the yielding transmission member 22 in order to reduce abrasion and improve the action of the drive.

Means for normally holding the pinion 8 in extended relation with respect to the barrel 11 is provided in the form of a spring 27 in the barrel bearing against the flange 10 of the pinion and the nut 13. Means for defining the operative position of the pinion is provided in the form of a shoulder 28 on the screw shaft which acts as a stop for the nut 13 and accordingly limits the longitudinal movement of the barrel and pinion. Means normally holding the pinion in idle position is provided in the form of an anti-drift spring 29 bearing at its ends against the nut 13, and a flange 31 on the shoulder 28 of the screw shaft.

The threads of the screw shaft 2 terminate adjacent the idle position of the nut 13 so that when the nut is in idle position, it may overrun the screw shaft. Means for insuring re-entry of the nut on the threads of the screw shaft when the shaft is rotated, is provided in the form of a spring 32 located on the power shaft 1 between the screw shaft and pinion.

In operation, starting with the parts in the positions illustrated in Fig. 1, rotation of the power shaft 1 is transmitted by the pin 3 to the screw shaft 2 whereby the nut 13 is caused to thread itself along the screw shaft, which longitudinal movement is transmitted through the barrel 11 to the pinion 8 whereby it is caused to mesh with the engine gear 9. When longitudinal movement of the nut 13 is stopped by the shoulder 28 of the screw shaft, the nut is caused to rotate with the screw shaft, and this rotation is transmitted through the driving block 17, the yielding transmission member 22 and the driven block 19 to the barrel 11 whereby the pinion is caused to rotate and crank the engine. When the engine becomes self-operative, the parts are returned to their normal positions through the overrunning of the pinion due to the acceleration of the engine gear. The pinion, barrel and nut can thereafter overrun the screw shaft until their momentum is dissipated, after which the reentry spring 32 moves the nut into initial engagement with the threads of the screw shaft.

If, during the meshing operation, a tooth of the pinion should abut against a tooth of the engine gear, the longitudinal motion of the pinion is temporarily stopped, but the barrel and its associated parts can continue to move forward while compressing the mesh-enforcing spring 27. When sufficient friction has been built up in the threads of the nut and screw shaft to index the pinion into proper registry with the tooth spaces of the engine gear, the pinion is snapped into mesh by the spring 27, whereupon the cranking operation proceeds as usual.

Although but one form of the invention has been shown and described in detail, it will be understood that other forms are possible and various changes may be made in the design and arrangement of the parts without departing from the spirit of the invention as defined in the claims appended hereto.

What is claimed is:

1. In an engine starter drive, a power shaft, a screw shaft fixed thereon, a pinion slidably journalled on the power shaft, a nut threaded on the screw shaft, and means for yieldably connecting the pinion for rotation and longitudinal movement with the nut including a barrel having a splined connection with the pinion, a compression spring in the barrel between the nut and pinion, circumferentially spaced abutments on the barrel and nut, and an arcuate elastically compressible member cooperating with said abutments to resist relative rotary movement between the barrel and nut.

2. In an engine starter drive, a power shaft, a screw shaft fixed thereon, a pinion slidably journalled on the power shaft, a nut threaded on the screw shaft, and means for yieldably connecting the pinion for rotation and longitudinal movement with the nut including a barrel swiveled at one end on the nut and splined at its other end to the pinion, a compression spring between the nut and pinion, circumferentially spaced abutments on the nut and barrel, and an arcuate body of elastically deformable material bearing at its ends against said abutments.

3. In an engine starter drive, a screw shaft, a nut threaded thereon, a barrel member swiveled at one end to the nut and having inwardly extending lugs at its other end, a pinion telescoped in said other end of the barrel with its teeth slidably engaging the lugs of the barrel, a compression spring normally holding the pinion extended from the barrel, an abutment fixed to the nut, an abutment fixed to the barrel circumferentially spaced therefrom, and a body of elastically deformable material adapted to bear at its ends against said abutments and resist relative circumferential movement thereof.

4. In an engine starter drive, a power shaft, a screw shaft thereon having a stop shoulder at one end, a pin extending transversely through said shaft, a thimble on the screw shaft surrounding the pin providing a smooth cylindrical exterior surface, a nut on the screw shaft freely slidable over the thimble, a pinion yieldably connected to the nut for rotary and longitudinal movement therewith, a spring urging the nut off the threads of the screw shaft onto the thimble, and a re-entry spring for the nut limiting longitudinal movement of the pinion toward the screw shaft.

5. In an engine starter drive, a power shaft, a hollow shaft fixed thereon threaded for a portion of its length and provided with a stop shoulder, a pinion slidably journalled on the power shaft, a nut on the hollow shaft, means yieldingly connecting the nut to the pinion including a barrel member journalled at one end on the nut and splined at its other end to the pinion, a compression spring in the barrel between the pinion and nut, an anti-drift spring in the barrel between the nut and shoulder urging the nut off the threaded portion of the hollow shaft, a re-entry spring for the nut between the hollow shaft and pinion, circumferentially spaced abutments on the nut and barrel, and a body of elastically deformable material between said abutments.

JAMES E. BUXTON.